United States Patent

[11] 3,582,550

[72] Inventors Lewis A. Latanzi
Wilton;
Edward G. Keplinger, New Milford, both of, Conn.
[21] Appl. No. 781,063
[22] Filed Dec. 4, 1968
[45] Patented June 1, 1971
[73] Assignee Graphic Sciences, Inc.
Danbury, Conn.

[54] SELF-SYNCHRONIZING GRAPHIC TRANSMISSION AND REPRODUCTION SYSTEM
17 Claims, 2 Drawing Figs.

[52] U.S. Cl. ........ 178/69.5, 178/6.6, 318/314, 318/318
[51] Int. Cl. ........ H04l 7/00
[50] Field of Search ........ 178/69.5 F, 69.5, 6.6 A; 318/314, 318, 329

[56] References Cited
UNITED STATES PATENTS

| | | | |
|---|---|---|---|
| 3,176,208 | 3/1965 | Gifft ........ | 318/314 |
| 3,483,319 | 12/1969 | Watanabe et al. ........ | 178/6.6A |

*Primary Examiner*—Robert L. Griffin
*Assistant Examiner*—Donald E. Stout
*Attorney*—Blair, Cesari and St. Onge

ABSTRACT: The angular position of a drum in a rotary drum facsimile system is synchronized with respect to a clock by means of a variable frequency generator which drives the drum motor at different speeds dependent on the error in the drum angle until this error is reduced to an acceptable amount. A unique multivibrator having a controllable pulse length is used to vary the driving speed.

Figure 1:
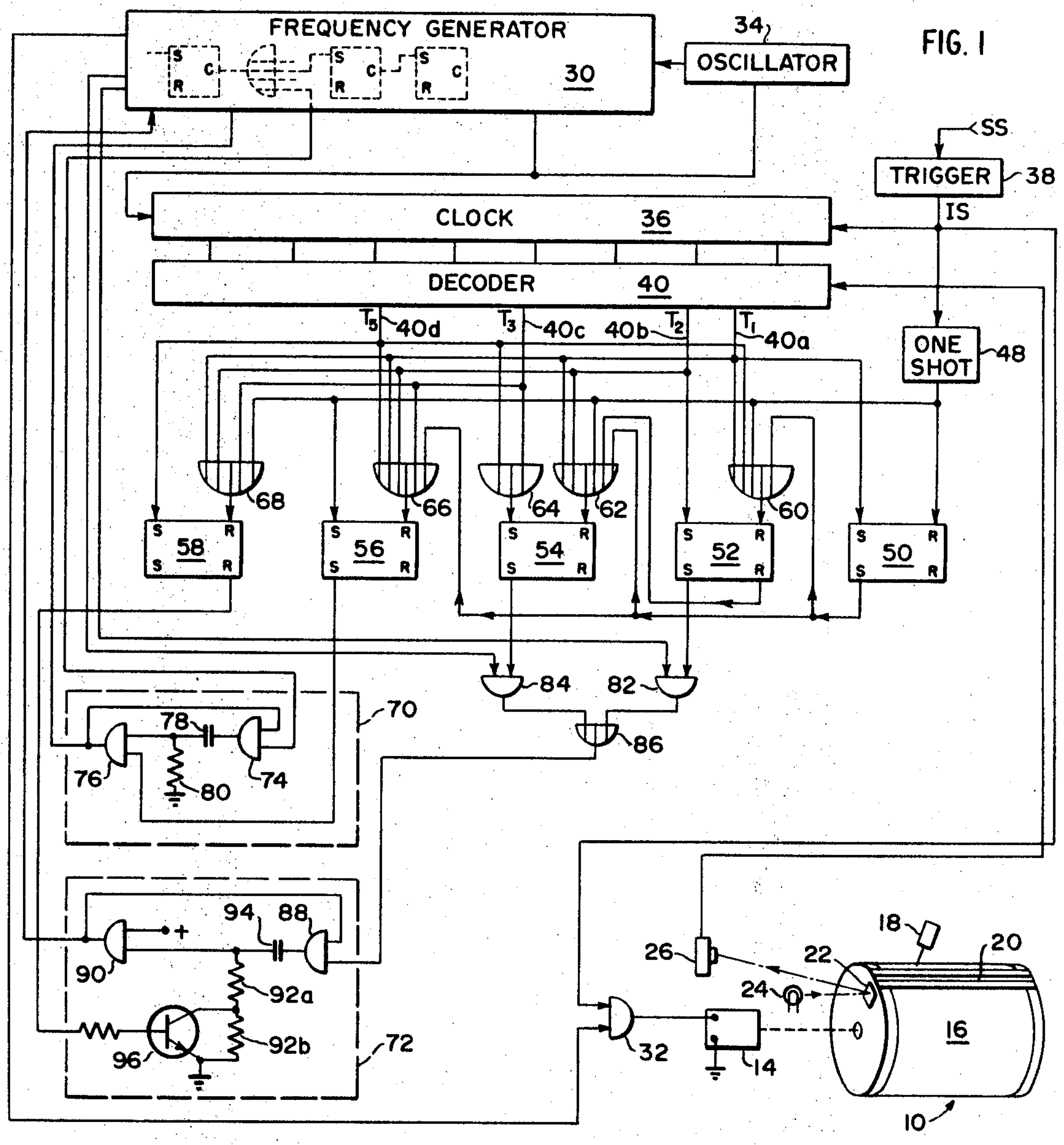

INVENTORS
LEWIS A. LATANZI
EDWARD G. KEPLINGER
BY
Blair Cesari & St. Onge
ATTORNEYS

SELF-SYNCHRONIZING GRAPHIC TRANSMISSION AND REPRODUCTION SYSTEM

BACKGROUND OF THE INVENTION

1. Field of the Invention

The invention relates to a synchronizing circuit for a rotary drum facsimile system. More particularly, the invention comprises a drum-position synchronizer for a rotary drum facsimile system.

2. Prior Art

A facsimile system is used to reproduce the contents of a document at a remote location. Such a system generally comprises a facsimile transmitter at one station for generating signals indicative of the contents of the document, a receiver at another station remote from the first for forming a reproduction of the document in accordance with the transmitter signals, and a communication channel joining the two stations.

In a rotary drum facsimile system, the original document and the copy sheet on which the reproduction is to be made are mounted on rotating drums at the transmitter and receiver stations, respectively. As the transmitter drum rotates, portions of the document positioned on it are carried past a detector to develop the transmitter signals. Similarly, the receiver drum carries corresponding portions of the reproduction past a printing head that "prints" on these portions in accordance with the transmitter signals.

Since the copy sheet has definite physical boundaries, the message to be reproduced must be positioned in a fixed relation to these boundaries. In order to obtain a faithful reproduction, therefore, it is generally necessary to insure that the reproduction starts at approximately the same lateral position on the copy sheet as the message starts on the original document. Otherwise, the reproduction may start in the middle of a page or even at the far side, and portions of it may well be displaced off the edge of the page and lost. Accordingly, the document and the copy sheet must bear roughly the same angular orientation with respect to a common reference when the drums are rotating. This alignment of the angular positions of the drums is referred to herein as "drum synchronization."

Prior synchronizing systems have used a continuous synchronizing signal sent over the communication channel connecting the facsimile transmitter and receiver. Unfortunately, in some types of communication channels, for example, in telephone lines, a net frequency shift occurs in the transmitted signals; this frequency shift distorts the synchronizing signals and alters their time relation to each other so that the synchronization is disrupted. As a result, a given receiver will have differing synchronization characteristics when connected to different communication channels.

In effectuating synchronization of a facsimile transmitter and receiver, it is desirable to accomplish the synchronization in as brief a time as possible in order to conserve total transmission time. In some facsimile systems presently available, this synchronization time may be as long as 15 seconds. Since it is necessary to synchronize the transmitter and receiver for each transmission, the time required to attain synchronism can accumulate to a substantial amount when a number of transmissions are to be made.

BRIEF SUMMARY OF THE INVENTION

A. Objects

Accordingly, it is an object of the invention to provide a drum synchronizer for a rotary drum facsimile system.

Another object of the invention is to provide a drum synchronizer requiring only a single synchronizing pulse of relatively short duration to initiate a synchronization cycle.

A further object of the invention is to provide a drum synchronizer which rapidly brings a receiver drum into synchronization with the transmitter drum in a rotary drum facsimile system.

Yet another object of the invention is to provide a drum synchronizer which is capable of locking the receiver and transmitter drums of a rotary drum facsimile system into synchronization independently of the frequency characteristics of the communication channel between them.

B. Brief Description of the Invention

The rotary drum synchronizer of the present invention uses a single short "start" signal generated at the transmitter and sent from the transmitter to the receiver to initiate the synchronizing cycle. This signal generates a local synchronizing signal which starts the drum motors in both the transmitter and receiver and initiates a timing cycle in local clocks at the respective stations. At each station a variable frequency generator is set at the beginning of the timing cycle to operate at a specific frequency; each generator drives the corresponding drum motor which is of the synchronous type so that its speed is proportional to the generator frequency. When the drums are synchronized, each generator drives its drum at a standard speed hereinafter called the "synchronous" speed. Since the operation of each drum is exactly the same, only the synchronization of the receiver drum will be described further.

As the receiver drum rotates, a marker on it generates a drum-position pulse once every full revolution. The time at which this drum pulse occurs is matched to one of a series of successive, discrete time intervals measured with reference to the occurrence of the synchronizing pulse. If the drum-position pulse occurs at nearly the same time as the synchronizing signal and within an accepted tolerance, the receiver drum is aligned or synchronized and the speed of the driving motor is immediately switched to the synchronous speed. However, if the angular position of the drum is misaligned by an amount greater than the accepted tolerance, the drum-position pulse lags behind the corresponding synchronizing signal.

The time interval between the drum pulse and the synchronizing signal is measured by applying the drum pulse to a decoder together with outputs from various portions of the timing clock whose zero reference time is established by the synchronizing signal. The clock outputs correspond to discrete time intervals located at increasing distances from the origin. The decoder thus provides an output on one of a set of output terminals dependent on the particular time interval at which the drum pulse occurs, measured with respect to the occurrence of the synchronizing signal.

The decoder output is applied to the variable frequency generator to alter its frequency in such a direction as to decrease the lag interval by a controlled amount. The comparison is then repeated and the frequency of the generator, and thus the frequency of the drum motor, is altered in discrete steps until the drum is oriented in approximate alignment with the transmitter drum. The frequency of the generator is then locked to the standard or synchronous driving frequency common to both the transmitter and receiver drums for the remainder of the reproduction cycle. Since both drums are now locked to the same speed, their synchronism is maintained throughout the reproduction.

Since the reference position of the receiver drum generally lags behind the time of occurrence of the synchronizing signal prior to synchronization, the receiver drum is initially driven at a speed greater than the synchronous speed in order to reduce the lag by a discrete amount and is then driven at successively slower speeds until synchronization is achieved. When the receiver drum lags the synchronizing signal by a substantial portion of a full revolution, however (of the order of 270° or greater), the receiver drum speed is immediately decreased below the synchronous speed to cause it to lag even further behind. The drum continues at this decreased rate until the drum lags a full 360° behind, at which time the driving speed is brought up to the synchronous speed and this speed is then maintained throughout the reproduction.

In altering the frequency of the variable frequency generator, a unique "one-shot" multivibrator is used. This one-shot has the usual pair of AND gates connected in series by an R-C differentiating circuit. In addition, however, it contains a switch placed across a portion of the resistance in the differentiating circuit to modify the time constant on the differentiator when the switch is turned on. Thus, either of two pulse lengths may be selected by means of the switch.

SPECIFIC DESCRIPTION OF THE INVENTION

Figure 2:
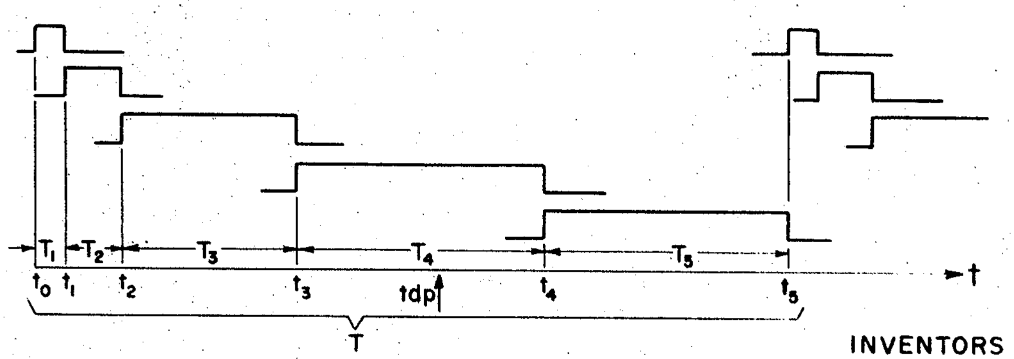

For a fuller understanding of the nature and objects of the invention, reference should be had to the following detailed description taken in connection with the accompanying drawing, in which:

FIG. 1 is a schematic diagram of a drum-position synchronizer constructed in accordance with the present invention; and FIG. 2 is a timing diagram for the synchronizer of FIG. 1.

In FIG. 1 a rotary drum 10 is rotated around a shaft 12 by means of a motor 14. The drum 10 carries a copy sheet 16 on which a reproduction is to be made by means of a stylus 18 actuated from a remote transmitter. The copy sheet 16 is held onto the drum by bands 20 extending across the drum from side to side. A reference marker 22 in the form of a small mirror fixed to an end face of the drum reflects light from a light source 24 into a photodetector 26 when the marker and the photodetector are aligned. The marker is of relatively small width so that a single narrow pulse (the "drum pulse") is generated by the photodetector 26 once during each revolution of the drum 10.

The motor 14 is driven from a frequency generator 30 through a gate 32. The generator 30 in turn derives its basic frequency from a stable, fixed local oscillator 34. The generator 30 contains means to vary its output frequency. Initially it is set to operate at a frequency corresponding to a drum speed in excess of the synchronous speed. The reasons for this will be made clear below.

A clock 36 is provided to establish the appropriate timing for the synchronizer. Its timing cycle is equal to the time T required by the drum to make a complete revolution when the drum is operating at its synchronous speed. Accordingly, the clock 36 initiates a new timing cycle every T seconds. The clock 36 is reset to its zero position on receipt of the internal start signal (IS). This signal is generated by a Schmidt trigger 38 on receipt of the synchronizing signal (SS) which is sent from the transmitter at the same time that the transmitter internal start signal is generated. Thus, the clock in essence counts time from the occurrence of the synchronizing signal, and the beginning of each new timing cycle serves as a reference which is related in a periodic manner to the occurrence of the start signal. The internal start signal, which preferably has the form of a step function, is also applied to the gate 32 to pass the output of the frequency generator 30 to the motor 14.

The motor 14 rotates the drum 10 which generates a drum pulse once during each rotation. Generally, the first pulse will lag behind the internal start signal by a substantial amount. The synchronizing arrangement uses the succeeding pulses to control the drum speed until the drum orientation is what it would have been if the first pulse had coincided with the internal start signal. The same process takes place at the other end of the line, so that the orientations of the transmitter and receiver drums correspond with the respective internal start signals. Since these signals are generated at approximately the same time, the drums have substantially the same orientation when synchronized.

The present invention measures the drum pulse lag (the "angular misalignment" of the drum) and drives the drum 10 at one or more speeds other than the synchronous speed until the lag is eliminated. This is accomplished by comparing the time of occurrence of successive drum pulses with the clock reference time. To do this, each drum pulse generated by the photodetector 26 is applied to a decoder 40 together with the input from the clock 26. The decoder is formed from the usual coincidence gates to provide an output on one or more lines 40*a*, 40*b*, 40*c* and 40*d* depending on the state of the clock 36 at any given time, and also depending on whether a drum pulse has been generated during the time interval the clock is in a given state. This corresponds to dividing the period T of the clock (and thus of the drum) into five discrete time segments, since a particular instant of time lies either within one of the four discrete time intervals selected by the decoder 40 or within the remaining interval within the period T.

This will be understood more clearly by reference to FIG. 2 which shows a timing diagram of the circuit of FIG. 1. The period T is broken up into five discrete intervals or slots labeled $T_1$ to $T_5$, respectively. The interval $T_1$ begins at time $t_0$ and ends at time $t_1$. The interval $T_2$ begins at time $t_1$ and ends at time $t_2$. The remaining intervals are defined in a similar fashion.

The zero time reference $t_0$ is the time of occurrence of the internal start signal. Each interval $T_i$ corresponds to a range of angular misalignment $E_i$ of the drums. For example, a point in the interval $T_1$ corresponds to an angular misalignment $E_1$ of not more than $t_1/T \times 360°$; a point in the interval $T_2$ corresponds to an angular misalignment $E_2$ of not more than $t_2/T \times 360°$, and so forth. For reasons to be described below, each interval $T_i$ is associated with a generator frequency $F_i$ and a motor speed $S_i$.

During the time intervals $T_1$—$T_3$ and $T_5$, the decoder 40 provides an output on a given line corresponding to the occurrence of a drum pulse during the interval associated with that line and provides zero output on the other lines. For example, if a drum pulse occurs during the interval $T_3$, the line 40*c* of the decoder 40 has an output on it while the remaining lines do not. The generation of an output on a particular line therefore provides a direct indication of the magnitude of the time lag between the occurrence of the internal start pulse and the occurrence of the drum pulse and thus indicates the angular misalignment between the receiver and transmitter drums; the greater this misalignment, the later the time interval in which the drum pulse occurs.

The outputs on lines 40*a*—40*d* are applied to flip-flops 50—58 both directly and through OR gates 60—68. As will be seen below, these flip-flops set the generator 30 to the appropriate driving frequency. Flip-flops 50, 52, 54 and 58 are "set" by the output of the corresponding gates 40*a*—40*d*, respectively, while flip-flop 56 is "set" by the output of the Schmidt trigger 38 through a one-shot multivibrator 48; additionally, flip-flop 54 is set by the output of gate 40*d*. The flip-flops 52—58 are reset from one or more of the lines 40*a*—40*d* other than the line which set them; additionally, flip-flops 52—56 are reset by flip-flop 50, while flip-flop 54 is reset by flip-flop 52. Finally, flip-flop 50 is reset by the output of the one-shot multivibrator 48.

The flip-flops 50—58 control the rate at which the frequency generator 30 drives the motor 14. They do this by selectively energizing one of a pair of one-shot multivibrators 70 and 72. The multivibrator 70 is formed from the usual AND gates 74 and 76 connected by a differentiating circuit formed by a capacitor 78 and a resistor 80. Gate 74 received inputs from one of the stages in the frequency generator and from the output of gate 76, while gate 76 receives inputs from the gate 74 through the R-C circuit and from the flip-flop 56.

The multivibrator 72 has AND gates 88 and 90 connected by a differentiating circuit comprising resistor 92 and capacitor 94. Unlike the resistor 80 in the multivibrator 70, the resistor 92 is split into two segments 92*a* and 92*b* and the collector-emitter circuit of a transistor switch 96 is connected across one of these segments 92*b*; the base of the transistor 96 is driven by the flip-flop 58. Gate 88 receives inputs from the output of gate 90 and from flip-flops 52 and 54 through AND gates 82 and 84 and OR gate 86; gate 90 receives inputs from gate 88 through the R-C circuit and from a DC source.

When the flip-flop 58 is "reset," it drives the base of the transistor 96 to turn the transistor fully "on"; this causes the collector-emitter circuit of the transistor to short out the resistor 92*b* and thus provides a short time constant for the multivibrator 72; this decreases the width of its output pulse. When the flip-flop 58 is "set," the base drive is cut off and the time constant of the circuit is increased by an amount corresponding to the added resistance 92*b*. This enables the multivibrator 72 to supply outputs of different pulse length dependent on whether flip-flop 58 is set or reset.

The multivibrators 70 and 72 supply inputs to the frequency generator 30 to alter its frequency at selected times. For purposes of the present application, the generator 30 may be treated as comprising a number of series-connected flip-flops forming a binary counter, the output of each flip-flop being connected as the input of the next following flip-flop. The outputs of the multivibrators 70 and 72 are then connected to various stages of the generator 30 to add a pulse at these stages at selected times to increase the generator frequency; the multivibrator 72 is also connected to inhibit signal transfer from one stage to another at selected times to lower the generator frequency. The generator 30 is thus capable of operating at one of several different rates, dependent on the states of the flip-flops 50—58 and thus on the angular misalignment between the transmitter and receiver drums.

Initially, the flip-flop 56 is set by the one-shot multivibrator 69 on receipt of a synchronization pulse at the receiver. Setting flip-flop 56 energizes the gate 76 in the multivibrator 70 so that pulses from the generator 30 trigger this multivibrator; the output of the multivibrator 70 is then applied to the generator 30 to cause it to operate at a frequency $F_4$ corresponding to a misalignment $E_4$. Thus, the operating frequency of the generator 30 is increased from a frequency $F_1$ corresponding to the synchronous speed $S_1$ of the drum 10 to a higher frequency $F_4$ chosen to reduce the misalignment within a limited time. This corresponds to making an initial estimate of the probable alignment error.

Assume, for the moment, that the alignment error has been correctly estimated, i.e. that the data pulse occurs at the time $t_{dp}$ within the time slot $T_4$ as shown in FIG. 2. The flip-flop 56 then remains in the "set" state, the flip-flops 50—54 and 58 remain in the "reset" state and the transistor 96 is "on," thereby shorting out resistor 92*b* and establishing a short time constant for the multivibrator 72. In response to pulses from the multivibrator 70, the generator 30 continues to supply its output pulses at the rate $F_4$ until the alignment error is reduced to a lower level corresponding, for example, to the interval $T_3$.

When the next drum pulse is applied to the decoder 40, the line 40*c* is energized during the interval $T_3$; this resets flip-flop 56 and sets flip-flop 54 to open gate 84. Transistor 96 remains "on." Pulses from the frequency generator 30 then trigger the multivibrator 72 through the gates 84 and 86 and cause the multivibrator to inject pulses back into the generator 30; this switches the generator 30 to a lower frequency $F_3$ corresponding to an error $E_3$; the motor 14 then 3; the drum 10 at a speed $S_3$.

The motor 14 drives the drum 10 at this speed until the misalignment is reduced even further to an amount corresponding to the time interval $T_2$. The next drum pulse again energizes the decoder 40; the line 40*b* is then energized during the interval $T_2$ and it resets flip-flop 54 and sets flip-flop 52. This opens gate 82 to pulses from the generator 30; these pulses are supplied at such a rate that, when passed through the multivibrator 72, they switch the operating frequency of the generator 30 to a frequency $F_2$ corresponding to an error $E_2$; the motor 14 then drives the drum 10 at a speed $S_2$.

The drum 10 continues rotating at the speed $S_2$ until the angular misalignment drops to a value $E_1$ as indicated by the occurrence of the drum pulse in the interval $T_1$. When this occurs the decoder 40 provides an output on the line 40*a* which sets flip-flop 50 and resets the remaining flip-flops. The flip-flops 52—56 are then locked into the reset position by the flip-flop 50. Setting flip-flop 50 removes the input to one-shot 72; the generator 30 then operates at its natural frequency $F_1$ and drives the motor 14 at its synchronous speed $S_1$. The drum 10 is now rotating at its synchronous speed and the angular misalignment has been reduced to within the tolerance limits corresponding to the slot $T_1$. The synchronizing circuit therefore continues operation in this state throughout the remainder of the reproduction cycle.

The operation of the synchronizer circuit of FIG. 1 for initial alignment errors occurring in one of the other time slots is similar to that described above. For example, assume that the first drum pulse occurs in the time slot $T_3$ after the synchronization pulse has been received. This drum pulse is applied to the decoder 40 to energize line 40*c* during the interval $T_3$; this sets flip-flop 54 and resets flip-flop 56 through OR gate 64. The flip-flop 54 then opens the gate 84 and supplies pulses from the frequency generator 30 to the one-shot multivibrator 72 which in turn injects pulses back into the generator to cause it to operate at a frequency $F_3$.

Since the flip-flop 58 has been reset by the output of AND gate 40*c*, the base of transistor 96 has a signal on it and this transistor is thus in the "on" state where it maintains a short time constant for the multivibrator 72. The generator 30 then drives the motor 14 at the frequency $F_3$ until the angular misalignment is reduced in steps to a value corresponding to the tolerance time slot $T_1$ at which time the motor is locked into the synchronous frequency.

Instead of driving the drum 10 at speeds greater than the synchronous speed in order to reduce the angular misalignment, it may sometimes be desirable to drive the drums at speeds less than the synchronous speed to accomplish the same end in a shorter time. For example, if the instantaneous position of the drum 10 lags behind its synchronous position (the position at which there is zero time lag between the synchronizing signal and the drum pulse) by an angle of the order of 270° or more, the drum may be viewed as leading its synchronous position by an angle of 90° or less. Accordingly, the angular misalignment may be reduced more quickly by retarding the drum orientation by 90° rather than advancing it by 270° in order to reach the synchronous position. The circuit of FIG. 1 is designed to accomplish this.

To illustrate this mode of operation, assume that the drum pulse occurs during the time interval $T_5$. The decoder then energizes the line 40*d* to set the flip-flop 58; the line 40*d* also sets the flip-flop 54 at this time for reasons to be described hereinafter. Setting the flip-flop 58 removes the drive from the base of the transistor 96; this opens the collector-emitter circuit of the transistor, thereby removing the short circuit across the resistor 92*b*. As a result, the time constant of the R-C circuit formed by resistor 92 and capacitor 94 is increased. This causes an output of increased pulse length when an input is applied to the one-shot 72.

As noted previously, the line 40*d* sets the flip-flop 54 at the same time that it sets the flip-flop 58. Setting flip-flop 54 opens gate 84 which then passes pulses from the generator 30 to the multivibrator 72. The multivibrator is triggered by these pulses and therefore injects pulses into the generator 30. Since the time constant of the multivibrator has been lengthened by the insertion of the resistor 92*b* into the circuit, these pulses are applied to the generator at such a rate as to prevent the transmission of certain of the pulses from one stage to another within the frequency generator; this lowers its operating frequency. As a result, the generator 30 now supplies output pulses at a frequency $F_5$ which is less than its natural frequency $F_1$; this corresponds to a reduced operating speed $S_5$ which will correct the angular misalignment $E_5$.

In contrast to the previous examples, the motor 14 is operated at this single "correction" frequency until the misalignment is reduced to within the accepted tolerance limits, i.e. to within the interval $T_1$ assuming no overshoot. This is performed as a one-step correction since the total possible misalignment in this case is limited. When the error has been reduced to this amount, the decoder provides an output on line 40*a* which sets the flip-flop 50 to remove the inputs to the one-shot 72 and restore the generator 30 to its natural frequency $F_1$. The output on line 40*a* also resets the flip-flops 52—58 to insure that the generator 30 remains "locked" to its natural frequency for the remainder of the reproduction cycle. If operation of the drum at the speed $S_5$ should cause an "overshoot" such that the misalignment error overshoots the magnitude corresponding to $T_1$ and instead switches to a value corresponding to $T_2$ or $T_3$, for example, the synchronizer will, of course, step down from these errors in the manner previously described.

It is possible that a drum pulse may overlap two adjacent time intervals. Pulses of this sort may be prevented from setting two or more flip-flops at the same time and thereby generating difficulties in the timing circuit by utilizing only the leading edge or only the trailing edge of the pulses to energize the flip-flops. If the leading edge of the pulse is used, the flip-flop corresponding to the lower driving rate will be energized whenever such a pulse is encountered. If, on the other hand, the trailing edge of the pulse is utilized, the flip-flop corresponding to the higher driving rate will be energized. Thus, the ambiguity created by the overlapping pulse is easily resolved.

With the circuit described above, we have been able to synchronize the transmitter and receiver drums within 5 seconds even under conditions of the worst misalignment. This was accomplished at a synchronous drum speed $S_1$ of 2.5 revolutions per second corresponding to a generator frequency $F_1$ of 160 Hz. The "correction" frequencies $F_2$—$F_5$ were 161, 165, 171 and 155 Hz. respectively.

From the foregoing, it will be seen that we have provided an improved drum position synchronizer for a rotary drum facsimile system. The synchronizer rotates the drum at different speeds above and below the synchronous speed until the angular misalignment between a synchronizing signal and the drum has been reduced to an acceptable amount. At this time, the drum is switched to its synchronous speed. The driving speeds, in general, are proportional to the magnitude of the angular misalignment; the greater the misalignment the greater the driving speeds utilized to reduce the misalignment to the accepted tolerance level.

A unique one-shot multivibrator is provided for varying the driving speed in accordance with the angular misalignment. The multivibrator has a switch associated with its R-C timing circuit to vary the time constant of the multivibrator, and therefore its pulse width, in accordance with the setting of the switch. Thus, an input from a single source is capable of driving the frequency generator to which the multivibrator is connected at one of two different rates dependent on the switch setting. This minimizes circuit complexity, reduces the need for an additional multivibrator, and reduces the cost of the synchronizing circuit.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. In a rotary drum facsimile system having a rotating drum for operation at a synchronous speed with no more than a predetermined angular misalignment with respect to a reference derived from a remotely generated synchronizing signal, the improvement comprising a drum synchronizer for angularly aligning said drum on receipt of said synchronizing signal, the synchronizer comprising:

- A. a motor driving said drum at a selected speed in accordance with inputs applied thereto;
- B. means for periodically generating drum signals at a rate proportional to the rotary speed of said drum and at times indicative of the angular misalignment;
- C. a clock
  - 1. generating timing intervals
    - a. having a duration equal to the rotational period of the drum when the drum is rotating at the synchronous speed;
    - b. beginning with the synchronization signal;
    - c. the start of each new timing interval providing a reference for the measurement of the angular misalignment during the said interval;
- D. decoding means
  - 1. associated with the clock and providing outputs during different time subintervals corresponding to fractions of the timing period;
  - 2. having means for gating the clock outputs with the drum signals to generate command signals indicative of the time difference between the reference signal and the drum signal in accordance with the particular clock subinterval during which the drum signal occurs;
- E. a frequency generator responsive to the command signals for operation at one of a plurality of frequencies in accordance therewith; and
- F. means connecting said frequency generator in driving relation with said motor to drive said motor at a speed dependent on said angular misalignment, the frequency generator changing the driving speed toward the synchronous speed in accordance with the different command signals generated by said gating means until the angular misalignment is reduced to within a predetermined amount.

2. A drum synchronizer according to claim 1 in which said clock comprises a plurality of bistable elements connected to provide a serial counting sequence, said decoders being connected to selected ones of said elements to establish distinct time subintervals within the clock counting period and being adapted to provide outputs on selected lines on receipt of drum signals in accordance with the time subintervals within which the drum pulses occur.

3. A drum synchronizer according to claim 1 in which said clock subintervals form successive time segments corresponding to increasing amounts of misalignment between the drum and the reference signal, the drum being driven successively at different speeds corresponding to the successive time segments until the misalignment is reduced to a predetermined amount.

4. A drum synchronizer according to claim 1 in which said frequency generator comprises a plurality of bistable elements connected to each other in serial counting relation to provide an output at a rate that is a submultiple of the rate of an input applied to it, said command signals being applied to selected stages thereof to alter the normal counting sequence at preselected times to thereby alter the rate at which the outputs are supplied by the generator in accordance with the command signals.

5. A drum synchronizer according to claim 4 in which the frequency generator is adapted to receive command signals of differing duration to alter the output frequency thereof, a command signal of a first duration increasing the generator output frequency and a command signal of a second longer duration decreasing its frequency.

6. A drum synchronizer according to claim 1 in which the means for generating said drum signals comprises a light source, a mirror mounted on the drum for rotation therewith and located at a selected angular orientation with respect to a reference position on the drum, said mirror being periodically illuminated by said light source as said drum rotates with respect to said source, and means for detecting light reflected from said mirror when so illuminated to provide a drum pulse signal indicative of the drum orientation at selected times.

7. A drum synchronizer according to claim 1 in which said command signals are applied to said frequency generator through a frequency control circuit comprising:

- A. a set of bistable elements, there being at least one such element for each different subinterval in excess of one into which the counting period of the clock is divided, said elements being set to one of two states in accordance with the speed at which the drum is to rotate; and
- B. at least one monostable multivibrator energizable by said elements at selected times to inject signals into said frequency generator at selected locations to alter the frequency of the generator in accordance with the state of said elements.

8. A drum synchronizer according to claim 1 in which said at least one multivibrator accepts at least two different inputs and provides at least two different outputs in accordance therewith, a first of said inputs triggering the multivibrator to provide a pulse output therefrom and a second of said inputs altering the length of said output pulse to thereby set the frequency of the generator to one of at least two different frequencies dependent on said inputs.

9. A drum position synchronizer according to claim 8 in which said multivibrators comprise first and second coincidence gates connected together by an R-C coupling circuit establishing the time constant of the pulse output from said gate, said switch being connected across a portion of the resistance to vary the time constant of the multivibrator.

10. A drum position synchronizer according to claim 9 in which said switch comprises a transistor having a collector-emitter circuit connected across a portion of the resistance and a base circuit for energization at selected times by said second input times to short the resistance across said collector-emitter circuit and decrease the time constant of said multivibrator.

11. A drum pulse synchronizer according to claim 2 which includes a single bistable element for each time subinterval into which said clock period is divided, one of said elements being responsive to the synchronizing signal to enable operation of the frequency generator at a selected rate in excess of the synchronous rate, each of the remaining elements being responsive to a different one of the outputs of said clock to enable operation of the frequency generator at differing rates, including the synchronous rate, depending on the angular misalignment between the drums.

12. A drum pulse synchronizer according to claim 11 in which all but one of the bistable elements are connected to supply inputs to a pair of monostable multivibrators, one of said inputs being connected to a switch in one of said multivibrators to control the time constant of the multivibrator and therefore the length of its output pulse.

13. A drum synchronizer according to claim 1 in which the frequency generator drives the drum motor at successively decreasing rates, each in excess of the synchronous rate, dependent on the angular misalignment between the drum pulse and the synchronizing signal when said misalignment is less than a first predetermined magnitude and drives said drum motor at a second rate, less than the synchronous rate, when the misalignment exceeds said first predetermined value.

14. In a rotary drum facsimile system, apparatus for synchronizing the angular orientation of a pair of drums adapted to be operated at a common synchronous speed within a fixed time interval after receipt of a common synchronization signal, the drums being separated from each other and each having associated therewith:

A. a variable speed synchronous motor connected to a corresponding drum for driving the drum at selected speeds in accordance with the inputs to said motor;

B. a frequency generator adapted to drive said motor at a rate dependent on command signals selectively applied to the generator;

C. means associated with each said drum for periodically generating a drum signal indicative of the angular orientation of a reference position on the drum;

D. a clock 1. having a timing period equal to the period of revolution of the drums when said drums are operating at the synchronous speed,
2. adapted to initiate a timing interval on receipt of the synchronization signal, said timing interval repeating itself as long as said clock is energized, the beginning of each timing interval serving as a reference for measuring the angular misalignment of the drum, E. a decoder 1. connected to said clock for receiving outputs from selected groups of stages corresponding to division of the timing period into successive, discrete time subintervals;
2. providing an output on one of a plurality of lines on receipt of said drum signal to provide a direct indication of the time subinterval, measured with respect to the start of each timing interval, in which said drum signal occurs;

F. a plurality of bistable elements, equal in number to the number of discrete time subintervals into which each timing interval is divided, all but one of the elements being connected to the decoder for energization thereby, the other of the elements being energized by the synchronizing signal, the energization of each element corresponding to detection of the drum pulse in a particular time subinterval and thereby providing a quantized indication of the angular misalignment;

G. a plurality of monostable multivibrators connected to all but one of said elements and adapted to generate command signals in accordance with the energization state of the elements and indicative of the angular misalignment, said command signals being supplied to the frequency generator at selected stages and selected times to set the generator to a frequency corresponding to the measured angular misalignment and chosen to reduce the misalignment to an accepted tolerance within a given time.

15. Apparatus according to claim 14 in which said frequency generator is capable of operation at at least one frequency respectively above and below the synchronous frequency as well as at the synchronous frequency, said generator initially being set by the bistable elements to operate at a frequency in excess of the synchronous frequency and thereafter being reset to operate at a frequency, other than the synchronous frequency, which is dependent on the angular misalignment of the drum.

16. Apparatus according to claim 15 in which the frequency generator is reset to operate at a frequency above the synchronous frequency when the angular misalignment is less than a predetermined amount and is reset to operate at a frequency below the synchronous frequency when the angular misalignment is greater than a predetermined amount, whereby the misalignment is efficiently reduced.

17. Apparatus according to claim 14 in which at least one of the multivibrators is adapted to receive a pair of inputs and to supply a command signal on reception thereof, the duration of the command signal being determined by one of said inputs and the time of occurrence of said signal being determined by the other.

UNITED STATES PATENT OFFICE
CERTIFICATE OF CORRECTION

Patent No. 3,582,550 Dated June 1, 1971

Inventor(s) Lewis A. Latanzi, et al

It is certified that error appears in the above-identified patent and that said Letters Patent are hereby corrected as shown below:

Column 9, claim 8, line 1, "1" should read -- 7 --. Column 9, line 13, claim 9, line 5, "said switch being" should read -- and a switch --.

Signed and sealed this 10th day of October 1972.

(SEAL)
Attest:

EDWARD M.FLETCHER,JR.
Attesting Officer

ROBERT GOTTSCHALK
Commissioner of Patents